United States Patent
Sharma et al.

(10) Patent No.: US 11,494,397 B1
(45) Date of Patent: Nov. 8, 2022

(54) DATA DIGITAL DECOUPLING OF LEGACY SYSTEMS

(71) Applicant: Accenture Global Solutions Limited, Dublin (IE)

(72) Inventors: Pragya C. Sharma, Mumbai (IN); Chandramouli Muralitharan, Chennai (IN); Ritu Pramod Dalmia, Mumbai (IN); Soubhagya Mishra, Bhubaneswar (IN); Manish Bachhania, Mumbai (IN); Nilesh D. Gupta, Jaipur (IN); Vikas Obaiah Pujar, Vasanthapura (IN); Pawan Kumar Mishra, Yelahanka (IN); Sachin Amod Gangwar, Kalyan (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/476,886

(22) Filed: Sep. 16, 2021

(51) Int. Cl.
*G06F 17/30* (2006.01)
*G06F 16/25* (2019.01)
*G06F 16/23* (2019.01)
*G06F 16/27* (2019.01)
*G06F 16/26* (2019.01)

(52) U.S. Cl.
CPC ........ *G06F 16/254* (2019.01); *G06F 16/2358* (2019.01); *G06F 16/2365* (2019.01); *G06F 16/2386* (2019.01); *G06F 16/26* (2019.01); *G06F 16/27* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,426,691 B1* | 7/2002 | Kido | G08B 5/229 340/7.52 |
| 2005/0013030 A1* | 1/2005 | Ehrlich | G11B 5/59633 |
| 2006/0172292 A1* | 8/2006 | Chilingarian | G16B 25/10 435/6.14 |
| 2014/0064288 A1* | 3/2014 | Melick | H04L 12/437 370/400 |
| 2014/0157370 A1* | 6/2014 | Plattner | H04L 63/06 726/4 |
| 2014/0310232 A1* | 10/2014 | Plattner | G06F 16/24539 707/602 |
| 2016/0275178 A1* | 9/2016 | Liu | G06F 16/319 |

\* cited by examiner

*Primary Examiner* — Hung D Le
(74) *Attorney, Agent, or Firm* — Fish & Richardson P.C.

(57) ABSTRACT

Methods, systems, and computer-readable storage media for determining for each query in a set of high-cost queries, an access pattern to data objects accessed by the query in a legacy system, determining for each query in a set of low-cost queries, an access pattern to each data object accessed by the query in the legacy system, providing a first set of design patterns representative of first data objects of the legacy system to be offloaded to the target system and a second set of design patterns representative of second data objects of the legacy system to remain on the legacy system, and executing at least one design pattern of the first set of design patterns to offload one or more first data objects to the target system.

20 Claims, 5 Drawing Sheets

DATA DIGITAL DECOUPLING OF LEGACY SYSTEMS

BACKGROUND

Enterprises conduct operations using computer-executable applications and software systems that generate massive volumes of data (e.g., multiple terabytes (TB), petabytes (PB) or even larger volumes of data). The data can be stored in various manners including, for example, files and/or databases (e.g., database tables). As technology evolves, the systems for storing and accessing data evolves. Older systems can be referred to as legacy systems. An example legacy system includes mainframes, which can be described as high-performance computers with relatively larger memory and processing capability that enable processing of workloads that can include significant numbers of calculations (e.g., billions of calculations) and transactions (e.g., in real-time). Example metrics that can be used to define workloads include Millions of Instructions Per Second (MIPSs) and/or Million Service Units (MSUs), which can each be described as units quantifying how much central processing unit (CPU) capacity a given workload consumes.

Legacy systems can have disadvantages. For example, workloads applied to mainframes are constrained by the MIPSs/MSUs allotted per instance (i.e., single server), which require workload prioritization and/or replanning releases to accommodate the availability of MIPSs/MSUs. Another disadvantage includes high consumption of MIPSs/MSUs. For example, mainframes can consume, on average, 40% to 60% of total database system MIPSs/MSUs for read-only transactions. Other disadvantages can include, for example, uncontrolled and growing total cost of ownership (TCO) to maintain mainframes, lack of skilled talent to maintain mainframes, limited analytics that can be executed with mainframes, tight coupling and complexity within mainframes, and data Darwinism (i.e., reduced competitiveness due to deteriorating data management infrastructure).

SUMMARY

Implementations of the present disclosure are directed to a data digital decoupling framework. More particularly, implementations of the present disclosure are directed to a data digital decoupling framework that leverages technologies, development methodologies, and offloading methods to build data and analytical systems that execute on top of legacy systems and data. As described herein, the data digital decoupling framework of the present disclosure discovers data stored in legacy systems, relationships between data and access frequency, and identifies data that can be offloaded from a legacy system to be made available for read-only transactions in a target system, provides recommendations as to configurations for the target system relative to the legacy system, and configures the target system and offloads data to the target system in accordance with a recommended configuration.

In some implementations, actions include executing, by a discovery engine of a data digital decoupling framework, a discovery process on the legacy system to provide discovery data comprising data objects stored within the legacy system and, for each data object, an access pattern and a central processing unit (CPU) utilization, determining, from the discovery data, a set of high-cost queries and a set of low-cost queries, for each query in the set of high-cost queries, determining an access pattern to each data object accessed by the query, the access pattern comprising a read frequency and a write frequency, for each query in the set of low-cost queries, determining an access pattern to each data object accessed by the query, the access pattern including a read frequency and a write frequency, providing, by a recommendation engine of the data digital decoupling framework, a first set of design patterns and a second set of design patterns based on access patterns of data objects, the first set of design patterns representative of first data objects of the legacy system to be offloaded to the target system, the first set of data objects determined to be associated with at least one query in the set of high-cost queries, and the second set of design patterns representative of second data objects of the legacy system to remain on the legacy system, the second set of data objects determined to be associated with at least one query in the set of low-cost queries, and executing at least one design pattern of the first set of design patterns to offload one or more first data objects to the target system. Other implementations of this aspect include corresponding systems, apparatus, and computer programs, configured to perform the actions of the methods, encoded on computer storage devices.

These and other implementations can each optionally include one or more of the following features: the first set of design patterns includes one or more of a data synchronization pattern and a data loader pattern; the data synchronization pattern includes a change data capture (CDC) mechanism to update data objects in a database of the target system in response to changes to data objects in a database of the legacy system, and the data loader pattern includes a batch update mechanism to update data objects in a database of the target system in response to changes to data objects in a database of the legacy system; the second set of design patterns includes one or more of a database wrapper pattern, a database view pattern, and a database service pattern; the database wrapper pattern includes a wrapper of the legacy system providing read-access to data objects in a database of the legacy system through a data visualization service, the database view pattern includes providing one or more views in the target system to data objects in the database of the legacy system, and the database service pattern includes providing a service for read-only access to data objects in the database of the legacy system through an application programming interface (API); executing at least one design pattern of the first set of design patterns to offload one or more first data objects to the target system includes replicating the one or more first data objects in the target system as respective one or more replicated first data objects and providing read-only access to the one or more first data objects from the target system, the one or more first data objects being maintained in the legacy system for write access; and the legacy system includes one or more mainframes.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
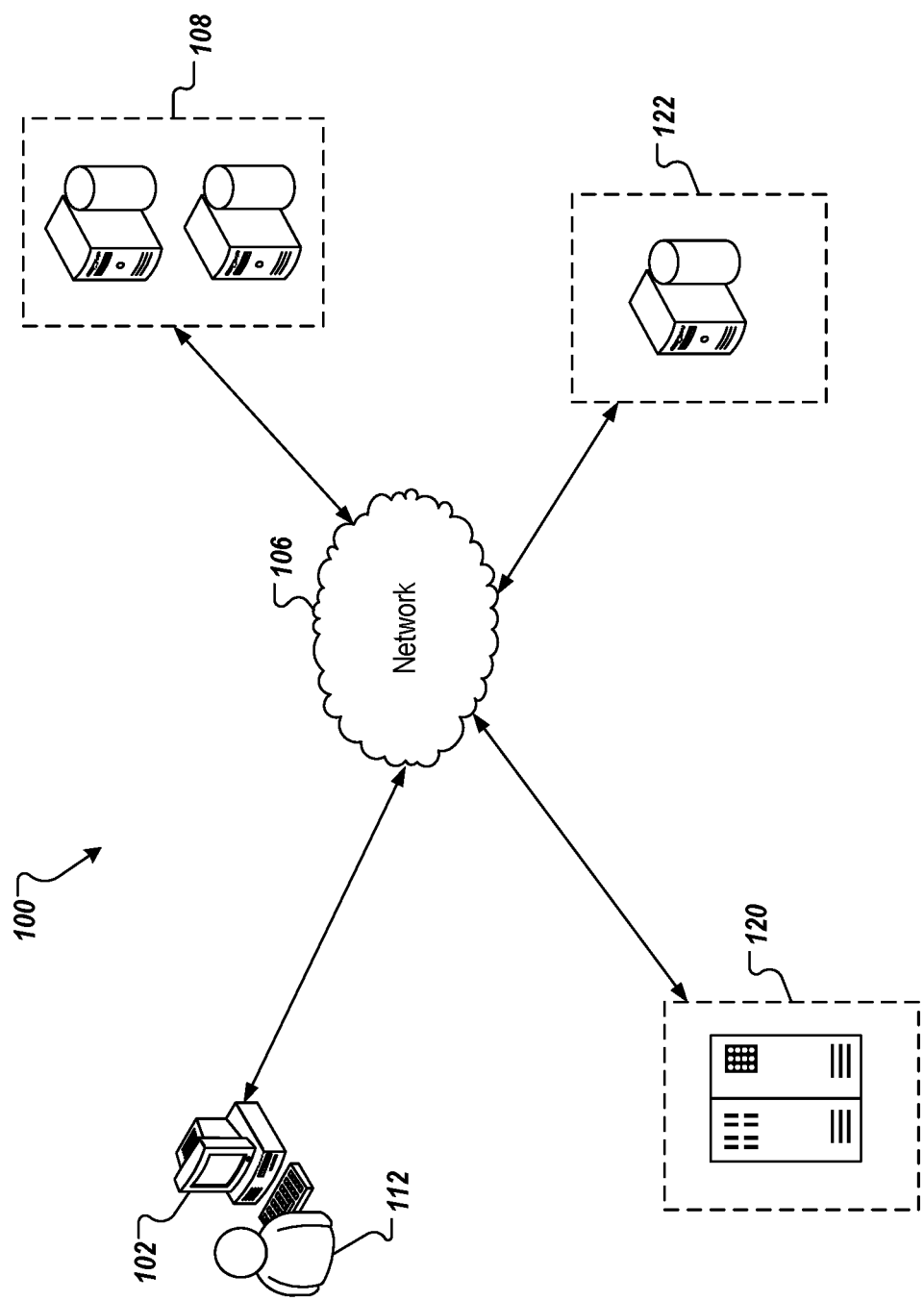
FIG. 1 depicts an example architecture that can be used to execute implementations of the present disclosure.

Implementations of the present disclosure are directed to a data digital decoupling framework. More particularly, implementations of the present disclosure are directed to a data digital decoupling framework that performs data digital decoupling as a process of leveraging technologies, development methodologies, and offloading methods to build data and analytical systems that execute on top of legacy systems and data. As described herein, the data digital decoupling framework of the present disclosure may include a set of components (each component being provided as one or more computer-executable programs) that execute functionality to discover data stored in legacy systems, relationships between data and access frequency, and identify data that can be offloaded from a legacy system to be made available for read-only transactions in a target system, provide recommendations as to configurations for the target system relative to the legacy system, and configure the target system and offload data to the target system in accordance with a recommended configuration.

In some implementations, actions include executing, by a discovery engine of a data digital decoupling framework, a discovery process on the legacy system to provide discovery data comprising data objects stored within the legacy system and, for each data object, an access pattern and a central processing unit (CPU) utilization, determining, from the discovery data, a set of high-cost queries and a set of low-cost queries, for each query in the set of high-cost queries, determining an access pattern to each data object accessed by the query, the access pattern comprising a read frequency and a write frequency, for each query in the set of low-cost queries, determining an access pattern to each data object accessed by the query, the access pattern including a read frequency and a write frequency, providing, by a recommendation engine of the data digital decoupling framework, a first set of design patterns and a second set of design patterns based on access patterns of data objects, the first set of design patterns representative of first data objects of the legacy system to be offloaded to the target system, the first set of data objects determined to be associated with at least one query in the set of high-cost queries, and the second set of design patterns representative of second data objects of the legacy system to remain on the legacy system, the second set of data objects determined to be associated with at least one query in the set of low-cost queries, and executing at least one design pattern of the first set of design patterns to offload one or more first data objects to the target system.

To provide context for implementations of the present disclosure, and as introduced above, enterprises conduct operations using computer-executable applications and software systems that generate massive volumes of data (e.g., multiple terabytes (TB), petabytes (PB) or even larger volumes of data). The data can be stored in various manners including, for example, files and/or databases (e.g., database tables). As technology evolves, the systems for storing and accessing data evolves. Older systems can be referred to as legacy systems. An example legacy system includes mainframes, which can be described as high-performance computers with relatively larger memory and processing capability that enable processing of workloads that can include significant numbers of calculations (e.g., billions of calculations) and transactions (e.g., in real-time). Example metrics that can be used to define workloads include Millions of Instructions Per Second (MIPSs) and/or Million Service Units (MSUs), which can each be described as units quantifying how much CPU capacity a given workload consumes, Legacy systems can have disadvantages. For example, workloads applied to mainframes are constrained by the MIPSs/MSUs allotted per instance (i.e., single server), which require workload prioritization and/or replanning releases to accommodate the availability of MIPSs/MSUs. Another disadvantage includes high consumption of MIPSs/MSUs. For example, mainframes can consume, on average, 40% to 60% of total database system MIPSs/MSUs for read-only transactions. Other disadvantages can include, for example, uncontrolled and growing total cost of ownership (TCO) to maintain mainframes, lack of skilled talent to maintain mainframes, limited analytics that can be executed with mainframes, tight coupling and complexity within mainframes, and data Darwinism (i.e., reduced competitiveness due to deteriorating data management infrastructure).

In view of the above context, implementations of the present disclosure are directed to a data digital decoupling framework that leverages technologies, development methodologies, and offloading methods to build data and analytical systems that execute on top of legacy systems and data. As described in further detail herein, the data digital decoupling framework enables identification of areas for optimizing consumption of MIPSs/MSUs by, for example, offloading at least a portion of data of the mainframe to the cloud. The data digital decoupling framework of the present disclosure also provides ready-to-consume reports, which can be used to offload read-only workloads from the mainframe and leverage the MIPSs/MSUs saved for priority workloads or to pursue other initiatives.

Implementations of the present disclosure are described in further detail herein with reference to example entities (e.g., systems, languages, and the like). Example entities, among others referenced herein, include the z/OS mainframe operating system (OS), the Db2 family of data management products, including the Db2 relational database system provided by IBM, the Kafka messaging framework provided by Apache, structured query language (SQL), Java, and Python. It is contemplated, however, that implementations of the present disclosure can be realized with any appropriate entities.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host a data digital decoupling framework. As described in further detail herein, the digital decoupling framework of the present disclosure includes a set of components, each component provided as one or more computer-executable programs. Example components include a discovery engine, a recommendation engine, and a cartridge module.

In the example of FIG. 1, an enterprise system 120 and a cloud system 122 are depicted. The enterprise system 120 represents a legacy system that includes one or more mainframes that support operations of an enterprise. The cloud system 122 represents a cloud platform, to which at least a portion of data maintained in the enterprise system 120 is offloaded using the data digital decoupling framework of the present disclosure. For example, and as described in further detail herein, the data digital decoupling framework executes a discovery phase to discover existing legacy applications and data access trends in the enterprise system 120, a design phase to design a hybrid decoupled system (including the enterprise system 120 and the cloud system 122) based on output of the discovery phase, and a delivery phase to instantiate the hybrid decoupled system (e.g., using commercial off-the-shelf (COTS) tools and/or custom components) and offload at least a portion of data of the enterprise system 120 to the cloud system 122.

Figure 2:
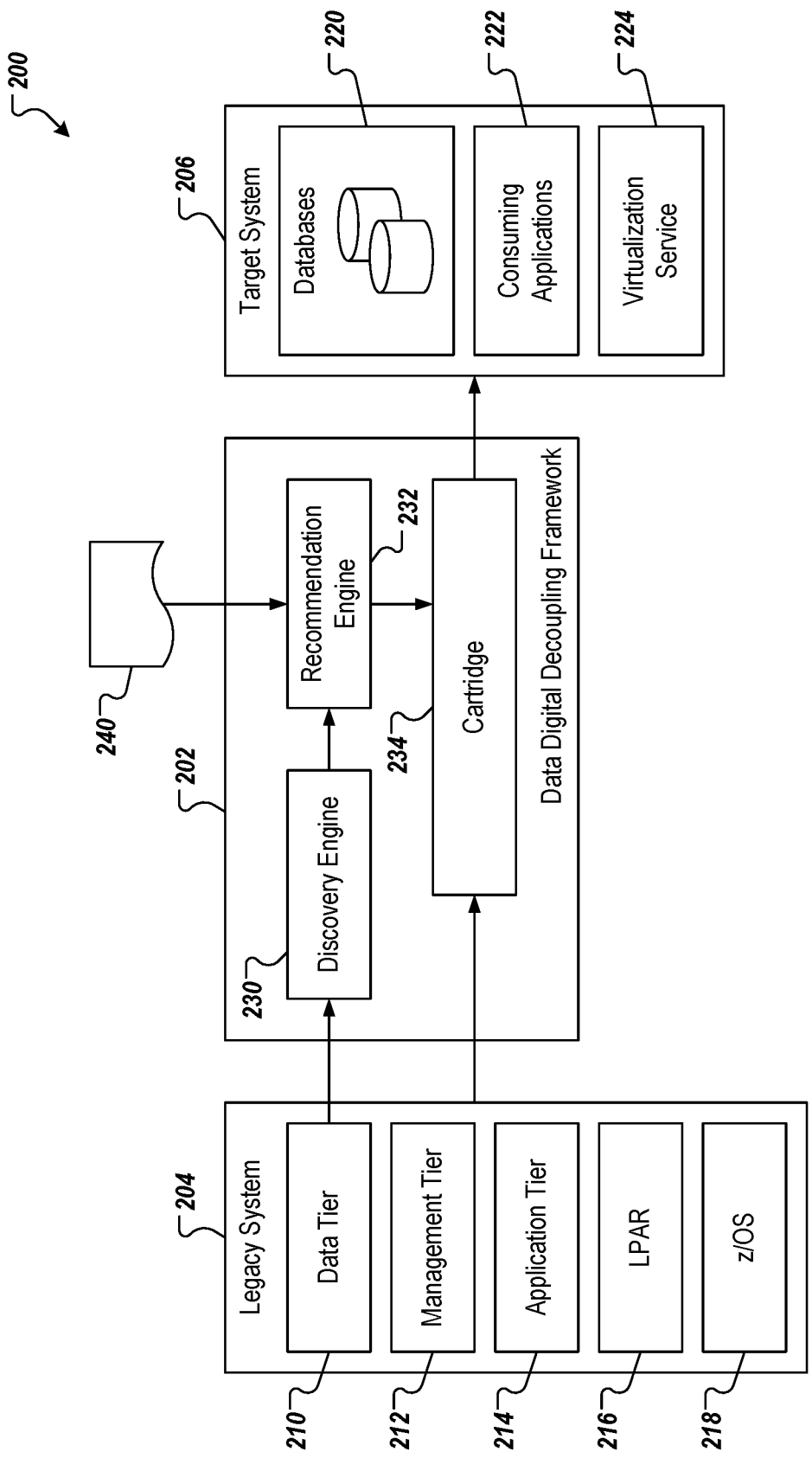
FIG. 2 depicts a conceptual architecture including a data digital decoupling framework in accordance with implementations of the present disclosure.

FIG. 2 depicts a conceptual architecture 200 including a data digital decoupling framework 202 in accordance with implementations of the present disclosure. The conceptual architecture 200 further includes a legacy system 204 (e.g., the enterprise system 120 of FIG. 1) and a target system 206 (e.g., the cloud system 122 of FIG. 1). As described in further detail herein, the data digital decoupling framework 202 enables offloading of data from the legacy system 204 to the target system 206. In this manner, the legacy system 204 and the target system 206 can together be described as a hybrid decoupled system that executes operations of an enterprise. For example, and as described in further detail herein, data can be offloaded from the legacy system 204 to be made available for read-only transactions in the target system 206. In some examples, write transactions to the data continue through the legacy system 204.

In general, the conceptual architecture 200 of FIG. 2 represents a logical architecture for data offloading from the legacy system 204 to the target system 206. As described in further detail herein, data offloading can include data replication, data persistence, information access, and data consumption. In some examples, data replication can include retrieving data from the legacy system 204, changing the data, and publishing the data in one or more event streams. In some examples, data persistence can include storing the data in one or more enterprise data warehouses (EDWs) and/or in one or more data lakes of, for example, the target system 206. Data persistence can also include integration, cleanings, and standardizing data. In some examples, information access can include data virtualization. In some examples, data consumption can include multiple channels for consuming the data from the target system 206 after offloading from the legacy system 204. Example channels can include, without limitation, analytics and reporting systems, applications, machine learning (ML) systems, data visualization systems, and the like.

In the example of FIG. 2, the legacy system 204 includes a data tier 210 (e.g., data stored in data files and/or databases), a management tier 212 (e.g., scheduler, security), an application tier 214, two or more logical partitions (LPARs) 216, and an OS 218. The target system 206 includes one or more databases 220, one or more consuming applications 222, and a virtualization service 224. The data digital decoupling framework 202 includes a discovery engine 230, a recommendation engine 232, and a cartridge module 234. As described in further detail herein, the cartridge module 234 provides functionality for implementing a recommended configuration and offloading at least a portion of the data of the legacy system 204 to the target system 206.

In accordance with implementations of the present disclosure, the data digital decoupling framework 202 executes a data digital decoupling process to identify data of the legacy system 204 for offloading to the target system 206. In some implementations, the data digital decoupling process includes a discovery phase, a design phase, and a delivery phase.

In some examples, the discovery phase is executed to discover the data that is stored within the legacy system 204, to determine a data landscape of the legacy system 204, to identify read access patterns and write access patterns from/to data that is stored in the legacy system, and to determine database queries having relatively high CPU utilization (e.g., database queries associated with CPU utilization that exceeds a threshold CPU utilization), as well as data objects associated with such queries. More particularly, high CPU utilization queries, also referred to herein as high-cost queries, increase the MIPSs/MSUs cost metrics for clients.

Accordingly, data discovery enables identification of data objects within the legacy system 204 that are associated with high-cost queries as candidates for offloading to the target system 206.

In some examples, the design phase is executed to provide target options and design patterns, provide a decoupling savings calculation, provide recommendations regarding appropriate design patterns, advise on candidate data for offloading (i.e., to the target system 206) and candidate data for retention (i.e., remain in the legacy system 204), and identify common data elements (CDEs) and recommendations for validation thereof. More particularly, the design phase provides a set of design patterns, each design pattern representing a configuration (recommended configuration) for offloading of data from the legacy system 204 to the target system 206 and execution of read-only transactions on the data in the target system 206.

In some examples, in the delivery phase, schema conversion and data definition language (DDL) creation are executed in the target system 206, instances are installed and provisioned within the target system 206 (e.g., data replication, messaging), change data capture (CDC) mappings are configured, messaging topics are created, initial data loading and validation are executed, incremental loading of data is enabled, and a data consumption pipeline is provisioned.

In further detail, during the discovery phase, the discovery engine 230 executes a set of scripts and functionality to discover data that is stored within the data tier 210 of the legacy system 204 as well as discover applications executing within the application tier 214 of the legacy system 204. As described in further detail herein, the discovery engine 230 processes discovery data to identify queries having relatively high CPU utilization (e.g., high-cost queries), to identify database tables and their associations, and to identify access patterns (e.g., read/write access patterns to data stored in the legacy system 204).

In some examples, during the design phase, the recommendation engine 232 processes the discovery data provided from the discovery engine 230 to provide recommendations on design patterns for data replication and data synchronization. In some examples, the recommendation engine 232 provides savings data that represents savings that can be achieved through offloading data to the target system 206. Here, savings can be provided in terms of savings in technical resources that would otherwise be expended, if data were not to be offloaded from the legacy system 204 (e.g., memory, bandwidth, CPU utilization). It is contemplated that, while recommendations for offloading are provided, not all recommendations need be adopted. For example, an enterprise, for which the data digital decoupling is to be performed, can select to implement all of the recommendations or a sub-set of the recommendations in the deliver phase.

In some examples, during the delivery phase, recommendations (e.g., enterprise-approved recommendations) provided during the design phase are implemented and data is offloaded from the legacy system 204 to the target system 206. That is, the data digital decoupling framework 202 configures the target system 206 and offloads data to the target system 206 in accordance with one or more recommended configurations. More particularly, the cartridge module 234 creates CDC pipelines, through which data from the legacy system 204 can be offloaded to the target system 206. In some examples, the pipelines are to one or more of the databases 220 and the consuming applications 222. In some examples, the cartridge module 234 represents a set of functions executed by one or more sub-modules to implement the recommendations. Example sub-modules can include, without limitation, a CDC sub-module, a message bus (or message broker) sub-module, a container sub-module, and a script sub-module.

In further detail, the discovery engine 230 leverages multiple discovery techniques to provide discovery data from the legacy system 204. An example discovery technique can include using a data information service of the legacy system, such as the system management facility (SMF) of z/OS. The SMF can be described as a component of z/OS, which provides a standardized method of writing records of activity within the legacy system 204 to a data set. SMF can also be described as providing instrumentation of all activities running within the legacy system 204, including without limitation, I/O, network activity, software usage, error conditions, processor utilization, and the like. Another example discovery technique can include executing a database trace, such as Db2 trace, in the legacy system 204. More particularly, the Db2 instrumentation facility component (IFC) provides a trace facility, Db2 trace, that can be executed to record Db2 data and events (e.g., statistics, accounting, audit, performance). In Db2 trace, each trace class captures information on several sub-system events, which identified by respective instrumentation facility component identifiers (IFCIDs). For example, and without limitation, IFCID record types 100 (SMF record type 100: statistics data) and 102 (SMF record type 102: performance) can be processed to capture queries with high CPU utilization.

Another example discovery technique can include using one or more monitoring tools. Example monitoring tools can include, without limitation, Db2 Query Monitor and Db2 Datagate, provided by IBM, and Automated Mainframe Intelligence (AMI) Data for Db2 provided by BMC Software. In some examples, such monitoring tools provide output that can be processed to extract data about frequent read-only queries with maximum CPU usage time (e.g., CPU usage time exceeding a threshold CPU usage time). Another example discovery technique includes determining statistics from a statement cache table. For example, the statement cache table DSN_STATEMENT_CACHE_TABLE contains information about the SQL statements stored within a statement cache (e.g., dynamic statement cache (DSC)), which is captured by executing an EXPLAIN STATEMENT CACHE ALL statement. In some examples, statistics from the statement cache table can be utilized to identify high CPU utilization queries.

For example, and without limitation, the following example process can be performed to use statement cache data to identify high-cost queries:

1. To externalize the statement cache statistics for performance analysis, START TRACE(P) CLASS(30) IFCID (316,317,318) can be executed. Here, IFCID 0316 contains the first 60 bytes of SQL text and statement execution statistics. IFCID 0317 captures the full text of the SQL statement. IFCID 0318 enables the collection of statistics. Db2 begins to collect statistics and accumulates statistics for the length of time when the trace is on. Stopping the trace resets all statistics.
2. The SQL workload that is to be analyzed is executed.
3. EXPLAIN STMTCACHE ALL is issued in a DSNTEP2 utility job.

In some examples, the workload is run and the EXPLAIN statement is issued, while the traces are still running. If the trace is stopped for IFCID 318, all statistics in the dynamic statement cache are reset. Db2 extracts all statements from the global cache and writes the statistics information into the DSN_STATEMENT_CACHE_TABLE for all statements in the cache that qualify based on the used SQLID. If the SQLID has SYSADM authority, statistics for all statement in the cache are written into the table. Evaluation of the statement cache performance begins by selecting from the inserted rows of the DSN_STATEMENT_CACHE_TABLE table. This captures the performance data in DSN_STATE-MENT_CACHE_TABLE. The STAT_CPU column provides the utilized CPU information for each executed query. Queries can be ordered and selected based on higher consumption of CPU from this table.

In some examples, data objects associated with the so-identified high CPU utilization queries can be determined by generating a plan table. For example, the plan table PLAN_TABLE contains information about access paths (to access data objects) that is collected from the results of EXPLAIN statements. For example, and without limitation, for the set of queries pulled from DSN_STATEMENT_CACHE_TABLE with high CPU utilization, the STMTID is extracted and EXPLAIN STMTCACHE STMTID is executed for each. This generates data in PLAN_TABLE, which holds each row for objects used in execution of the query. By joining the DSN_STATEMENT_CACHE_TABLE with PLAN_TABLE, a list of objects associated with high CPU utilization queries (high-cost queries) can be obtained in a single result set.

Another example discovery technique includes utilizing index space statistics. In some examples, index space tables, such as the SYSINDEXSTATS table and the SYSINDEXSPACESTATS table, hold data for each partition (e.g., LPAR) for the partitioning index. The statistics provide details on frequently accessed indexes. In some examples, the statistics of indexes from SYSINDEXSTATS table are used and, by associating the indexes to the tables (objects), tables that impact the performance of the legacy system can be identified (e.g., tables that are queried by high-cost queries).

Another example discovery technique includes monitoring buffer pools. Buffer pools can be described as areas of virtual storage that temporarily store pages of table spaces or indexes. By monitoring buffer pools, data objects associated with high CPU utilization queries (high-cost queries) can be identified. For example, statistics trace records distinguish random getpages from sequential getpages, number of pages that are prefetched by prefetch type and number of prefetch requests. The accounting trace records do not. If the prefetch engine finds all of the pages in the buffer pool, there is no I/O, but the scheduling of the SRB is counted as a request. A large delta between the number of requests and the number of prefetch I/Os is a clue that CPU time is being wasted through needless scheduling of the prefetch engines. From the statistics trace, how many pages were prefetched per I/O can be determined by dividing the total number of asynchronous pages prefetched by the number of prefetch I/Os.

Figure 3:
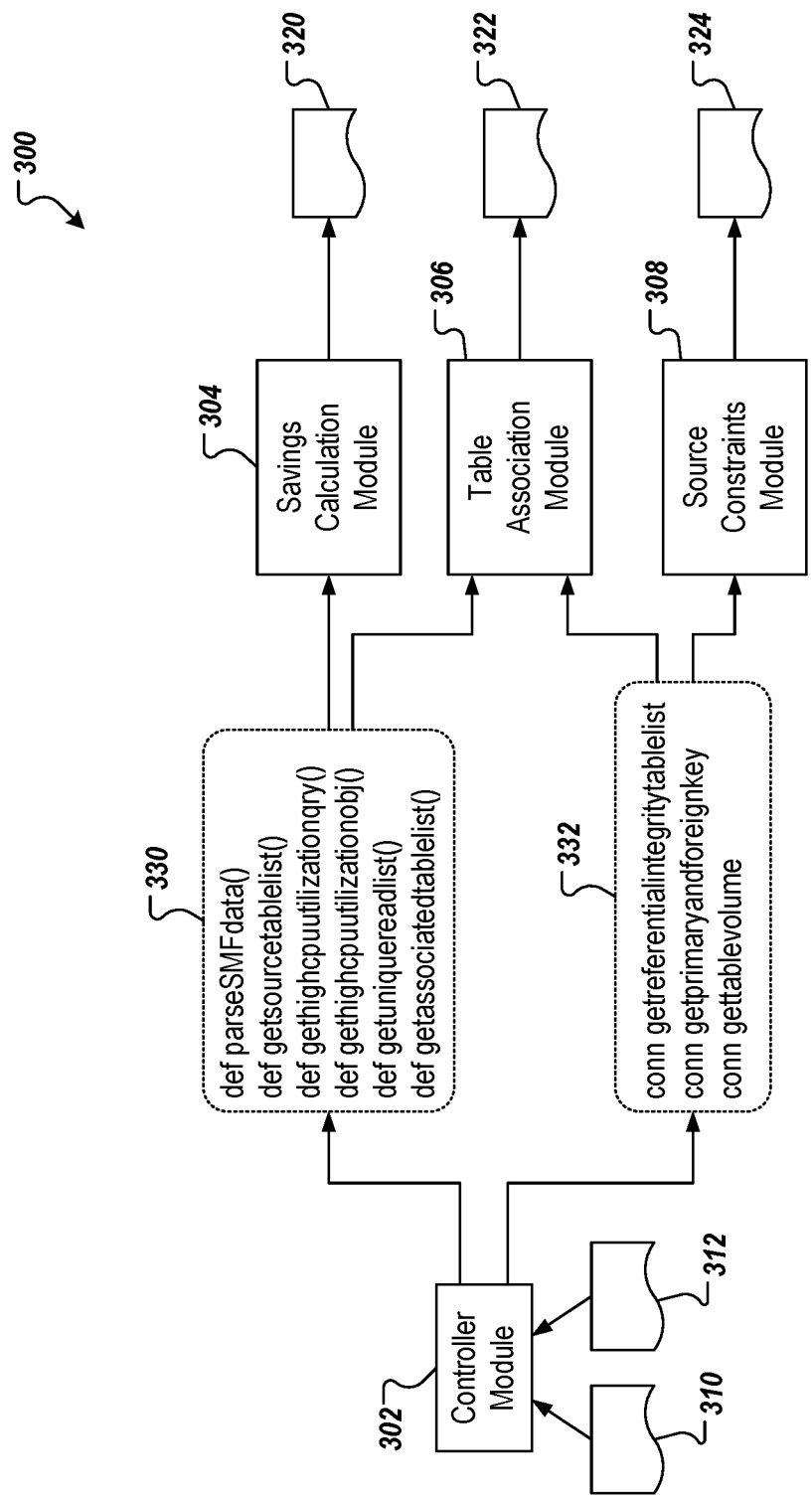
FIG. 3 depicts an example technical implementation of discovery and design in accordance with implementations of the present disclosure.

FIG. 3 depicts an example technical implementation 300 of discovery and design in accordance with implementations of the present disclosure. In the example of FIG. 3, the example technical implementation 300 includes a controller module 302, a savings calculation module 304, a table association module 306, and a source constraints module 308. In some examples, the savings calculation module 304 is a component of the recommendation engine 232. In some examples, the table association module 306 and the source constraints module 308 are components of the discovery engine 230. The controller module 302 receives an exploration document 310 and a performance document 312 (e.g., each provided as an Excel document) and processes of each using a controller script to provide a savings document 320, a table associations document 322, and a constraints and volume document 324 (e.g., each provided as an Excel document). More particularly, and as described in further detail herein, portions of each of the exploration document 310 and the performance document 312 are processed through first functionality 330 and second functionality 332 to provide input to the savings calculation module 304, the table association module 306, and the source constraints module 308 to provide the savings document 320, the table associations document 322, and the constraints and volume document 324, respectively.

In further detail, the discovery engine 230 generates the exploration document 310 and the performance document 312. In some examples, the exploration document 310 records data and calculations associated with data stored within the legacy system 204, which can include, but is not limited to, constraints check, a column list, a database size, dependencies, foreign keys, indexes, a data object list, a plan table, and primary keys. The performance document 312 (e.g., Db2 Explorer) provides data representative of performance of one or more databases within the legacy system, which can include, but is not limited to, routines, sequences, top X CPU users (e.g., top 10), top X elapsed times (e.g., top 10), top X index scans (e.g., top 10), top X synchronization buffer reads (e.g., top 10), top X synchronization buffer writes (e.g., top 10), top X table space scans (e.g., top 10), triggers, users, and utilizations.

In some implementations, the first functionality 330 includes a set of computer-executable functions. In some examples, the functions are coded in Python (e.g., def functions). Example functions include, but are not limited to, a parse SMF data function, a get source table list function, a get high CPU utilization query function, a get high CPU utilization object (data object) function, a get unique read list function, and a get associated table list function. In some examples, the parse SMF data function parses a set of SMF records (e.g., SMF type 101, 102, and 103 records) to provide parse records. In further detail, the SMF data functions takes a list of tables/databases/objects as input, and for each database/table, provides details based on the function applied. For example, the function getsourcetablelist( ) will take the database list as input, and recursively fetch the list of tables for each database. The output tablename acts as input to other functions (e.g., sto fetch constraints, referential integrity). In some examples, the get source table list function extracts the table list from the parse records, the table list listing the database tables of the legacy system 204. In some examples, the get high CPU utilization query function identifies high CPU utilization queries from the parse records (e.g., provides a list of queries determined to be high CPU utilization queries). In some examples, the get high CPU utilization object (data object) function identifies data objects that are associated with each of the high CPU utilization queries from the parse records. In some examples, the get unique read list function identifies a set of read-only transactions executed within the legacy system 204 from the parse records, and, for each read-only transaction a respective frequency. In some examples, the get associated table list function determines a list of associated tables (e.g., database tables that reference another database table) from the parse records.

In some implementations, the second functionality 332 is executed to connect to one or more databases of the legacy system 204 to retrieve one or more tables. In some examples, the second functionality 332 includes a set of database connections (e.g., Java database connectivity (JDBC)) that can be used to retrieve tables. In some examples, the set of database connections includes a get referential integrity table list connection, a get primary and foreign key constraints connection, and a get table volume connection. In some examples, the referential integrity table provides data representative of the integrity of references between tables based on primary and foreign key relationships. Each table in a database has a primary key, which is referred to as a foreign key when it appears in another table. In some examples, a primary key constraint includes a set of primary key columns (e.g., one or more) that is used to provide a unique index. In some examples, a foreign key constraint is a set of columns (e.g., one or more) that is used to establish and enforce an association between data in two tables to control the data that can be stored in the foreign key table. In some examples, the table volume is provided as a number of records stored within the one or more databases of the legacy system 204.

In some implementations, the savings calculation module 304 processes the table list, the list of high CPU utilization queries, and the list of data objects associated with the high CPU utilization queries to provide the savings document 320. In some examples, the savings document 320 provides a savings for each data object, if the data object were to be offloaded from the legacy system 204 to the target system 206. In some examples, the savings is provided in terms of technical efficiencies (e.g., reduced CPU, memory, bandwidth consumption). In some examples, savings is calculated as the number of tables to-be-offloaded multiplied by the number of MIPS consumed by those tables. In some examples, the savings calculation module 304 is a component of the recommendation engine 232. That is, the savings document 320 is provided by the recommendation engine 232.

In some implementations, the table association module 306 processes the table scan read frequency and the associated table list provided from the first functionality 330 and the table referential integrity from the second functionality 332 to provide the table associations document 322. In some examples, the table associations document 322 is created during the discovery process and identifies table references using foreign keys. This helps maintain referential integrity while offloading the data. In some examples, the table association module 304 is a component of the discovery engine 230, which provides the table associations document 322 as output of the discovery process.

In some implementations, the source constraints module 308 processes the table constraints and the record count from the second functionality 332 to provide the source constraints document 324. In some examples, the source constraints document 324 is created during the discovery process and identifies constraints applied to the source tables (e.g., nullable, unique). This will be required for actual offloading of data to the target system. In some examples, the source constraints module 308 is a component of the discovery engine 230, which provides the source constraints document 324 as output of the discovery process.

Accordingly, and as described in detail herein, output of the discovery phase includes the savings document 320, the table associations document 322, and the constraints and volume document 324, respectively, which are provided to the recommendation engine 232 of FIG. 2.

Referring again to FIG. 2, the recommendation engine 232 processes the output of the discovery engine 230 and the questionnaire 240 to provide one or more recommendations for offloading of data from the legacy system 204 to the target system 206. In some examples, the recommendation engine 232 processes the output and the questionnaire 240 through a design pattern analysis system to provide a set of recommendations, each recommendation including a target design pattern with a predicted savings and a set of database tables to be offloaded. In some examples, the questionnaire 240 includes a set of questions posed to an enterprise and a set of responses provided by the enterprise. In some examples, the enterprise is an entity, for which data digital decoupling is being performed. Example questions and possible answers are provided in Table 1:

TABLE 1

Example Questions and Potential Answers

| Questions | Possible Answers |
| --- | --- |
| Are you willing to have data migrated to a new database system? | a) Yes<br>b) No |
| What is the required data offload frequency? | a) Near-real-time (e.g., 5, 10 mins)<br>b) Batch Offload (e.g., once, twice daily) |
| Any preferred requirement to offload anything from existing database and system? If yes, what portion will be in scope for decommissioning offloading? | a) Specific Applications<br>b) Specific Functionality of an Application<br>c) The whole Database/System |
| What are the source and target connectivity details? | Host/Port/Database/User |
| Is there any PII or sensitive data attributes identified in the current system? | a) Yes<br>b) No |
| Are there any reports being generated from the current system? | a) Yes<br>b) No |

In general, the questionnaire can inform on which workloads/data should remain on the legacy system and which can be offloaded. In this manner, the enterprise's requirements can be taken into account for the offloading candidates.

In further detail, the design pattern analysis system executes a set of design pattern decision rules to identify a set of design patterns (e.g., including one or more design patterns). In some examples, at least a portion of the output of the discovery engine 230 is processed through the design pattern decision rules to identify the set of design patterns. In some examples, a first set of decision rules can be provided for data object associated with low-cost queries (e.g., queries associated with a CPU utilization not exceeding the threshold CPU utilization), and a second set of decision rules can be provided for data objects associated with high-cost queries (e.g., queries associated with CPU utilization exceeding the threshold CPU utilization). In some examples, each design pattern rule compares a read frequency and a write frequency of data objects associated with high CPU utilization queries to respective thresholds. In this manner, a rule can determine whether a data object is associated with, for example, a high read frequency (e.g., read frequency exceeds a threshold read frequency) or a low read frequency (e.g., read frequency does not exceed the threshold read frequency), and a high write frequency (e.g., write frequency exceeds a threshold write frequency) or a low write frequency (e.g., write frequency does not exceed the threshold write frequency).

In general, a design pattern represents a configuration of the legacy system 204 and/or the target system 206 for writing data to and reading data from a database. Example design patterns for data that is to remain in the legacy system 204 (e.g., data objects not associated with high-cost queries) can include a database wrapper pattern, a database view pattern, and a database service pattern. Example design patterns for data that is to be offloaded from the legacy system 204 (e.g., data objects associated with high-cost queries) can include a data synchronization pattern and a data loader pattern.

In some examples, the database wrapper pattern is identified for data having a high read frequency and a low write frequency, and the same data is read multiple times. In the database wrapper pattern, data is maintained within a database of the legacy system 204 and write operations are conducted through the legacy system 204. However, external consumers (e.g., applications) can read data from the database through a wrapper. An example wrapper is provided in JDBC, which provides a wrapper function that gives access to relational databases. In some examples, the wrapper function connects databases using respective drivers and converts queries into the database query language, returning Java-compatible results. In this manner, the external consumers receive data in a uniform format. In some examples, the wrapper communicates with the database through a data virtualization (DV) service to read data from the database. The database wrapper pattern provides some advantages in that a number of I/O operations will be reduced to some extent due to cached data and data abstraction from source systems is provided.

In some examples, the database view pattern is identified for data having a high read frequency and a high write frequency, and application-based data access is needed. In the database view pattern, data is maintained within a database of the legacy system 204 and write operations are conducted through the legacy system 204. However, external consumers (e.g., applications) can read data from the database through views. A view can be described as a searchable object in a database that is defined by a query (e.g., a SQL query). A view can be referred to as a virtual table that does not actually store data (e.g., is not part of the physical schema of the database), and instead displays values of data stored in one or more database tables within the database. Once a view is created, the view can be queried through read-only transactions. The database view pattern has some advantages in that it provides application-based data access control and provides a common glossary to form an accurate ontology of the data.

In some examples, the database service pattern is identified for data having a low read frequency and a high write frequency, and the data is to be available for advanced analytics. In the database service pattern, data is maintained within a database of the legacy system 204 and write operations are conducted through the legacy system 204. However, external consumers (e.g., applications) can read data from the database through a service (e.g., a database read service). In some examples, the service makes calls to the database through a representational state transfer (REST) application programming interface (API). The database service pattern provides advantages in ease of integration and extensibility of data stored within the legacy system 204 and reduction in I/O operations based on message lifecycle defined on publish/subscribe channels.

In some examples, the data synchronization pattern is identified for data having a high read frequency and a high write frequency, and a CDC field is available in source tables (i.e., database tables in the legacy system 204) to identify delta records. A delta record can be described as a record that is changed in a source table, which is to be updated in a corresponding table in the target system 206. More particularly, in the data synchronization pattern, data of the legacy system 204 is offloaded to the target system 206 and is maintained in both the legacy system 204 (e.g., as a source of truth) and the target system 206 (e.g., as a second source of truth). Any changes to data through write transactions in the legacy system 204 (resulting in delta records) are replicated through a CDC process in the target system 206. In this manner, the data in the target system 206 remains consistent with (synchronized with) the data in the source system. In the data synchronization pattern, external consumers (e.g., applications) read data directly from the database within the target system 206. The data synchronization pattern is advantageous in that it provides near real-time log-based CDC (i.e., changes in the legacy system 204 are replicated in the target system 206 in near real-time), supports multiple target systems, and reduces I/O operations in the legacy system 204.

In some examples, the data loader pattern is identified for data having a high read frequency and a low write frequency, and changes to data in the source system 204 are to be reconciled in the target system 206 through a batch process. More particularly, in the data loader pattern, data of the legacy system 204 is offloaded to the target system 206 and is maintained in both the legacy system 204 (e.g., as a source of truth) and the target system 206 (e.g., as a second source of truth). Any changes to data through write transactions in the legacy system 204 (resulting in delta records) are replicated through a batch process (e.g., extract, load, transform (ELT) process) in the target system 206. In this manner, the data in the target system 206 remains consistent with (synchronized with) the data in the source system. In the data loader pattern, external consumers (e.g., applications) read data directly from the database within the target system 206. The data loader pattern is advantageous in that it supports multiple target systems and reduces I/O operations in the legacy system 204.

As introduced above, either the data synchronization pattern or the data loader pattern is recommended for data that is recommended to be offloaded from the legacy system 204 to the target system 206. For example, and as described herein, high CPU utilization queries and data objects associated with such queries (i.e., data objects accessed by the queries) are identified. Consequently, a set of data objects can be provided as recommended for offloading to the target system (i.e., data objects associated with high CPU utilization queries). In some examples, only data objects having a high read frequency (e.g., a read frequency that exceeds a threshold read frequency) are included in the set of data objects. That is, for data objects having a low read frequency, advantages of offloading the data objects to the target system are mitigated, so such data objects are not recommended for offloading even though they might be associated with high CPU utilization queries.

For data objects having a high read frequency and a high write frequency, the data synchronization pattern is recommended. In this manner, frequent writes to the data objects within the legacy system 204 are quickly (e.g., in near real-time) synchronized to the corresponding data objects within the target system 206. For data objects having a high read frequency and a low write frequency, the data loader pattern is recommended. In this manner, infrequent writes to the data objects within the legacy system 204 can be synchronized in intermittent batches to the corresponding data objects within the target system 206.

As introduced above, the set of recommendations can be provided and a recommendation can be selected for implementation. For example, an enterprise, for which the set of recommendations is prepared can select a recommendation for implementations. As described in further detail herein, the cartridge module 234 executes implementation of the recommendation by configuring the target system 206 and offloading data from the source system 204 to the target system 206.

By way of non-limiting example, the data synchronization pattern can be considered for data objects that are to be offloaded to the target system 206 from the source system 204. In some examples, the cartridge module 234 includes a CDC sub-module to execute CDC functionality and a messaging framework sub-module to execute messaging functionality. An example CDC sub-module can execute IIDR CDC (data replication) provided by IBM. An example messaging framework includes Kafka. In some examples, the cartridge module 234 provides a CDC mapping configuration that automatically configures CDC mappings for source-to-IIDR and IIDR-to-Kafka, executes an initial data load (i.e., to load data objects from the source system 204 to the target system 206), and enables incremental data loading (i.e., synchronizing changes to data in the source system 204 with corresponding data in the target system 206). In some examples, synchronization is executed through a publish/subscribe paradigm provided by the messaging framework. For example, a change is published as a topic and databases that subscribe to the topic receive the change through the messaging framework.

Figure 4:
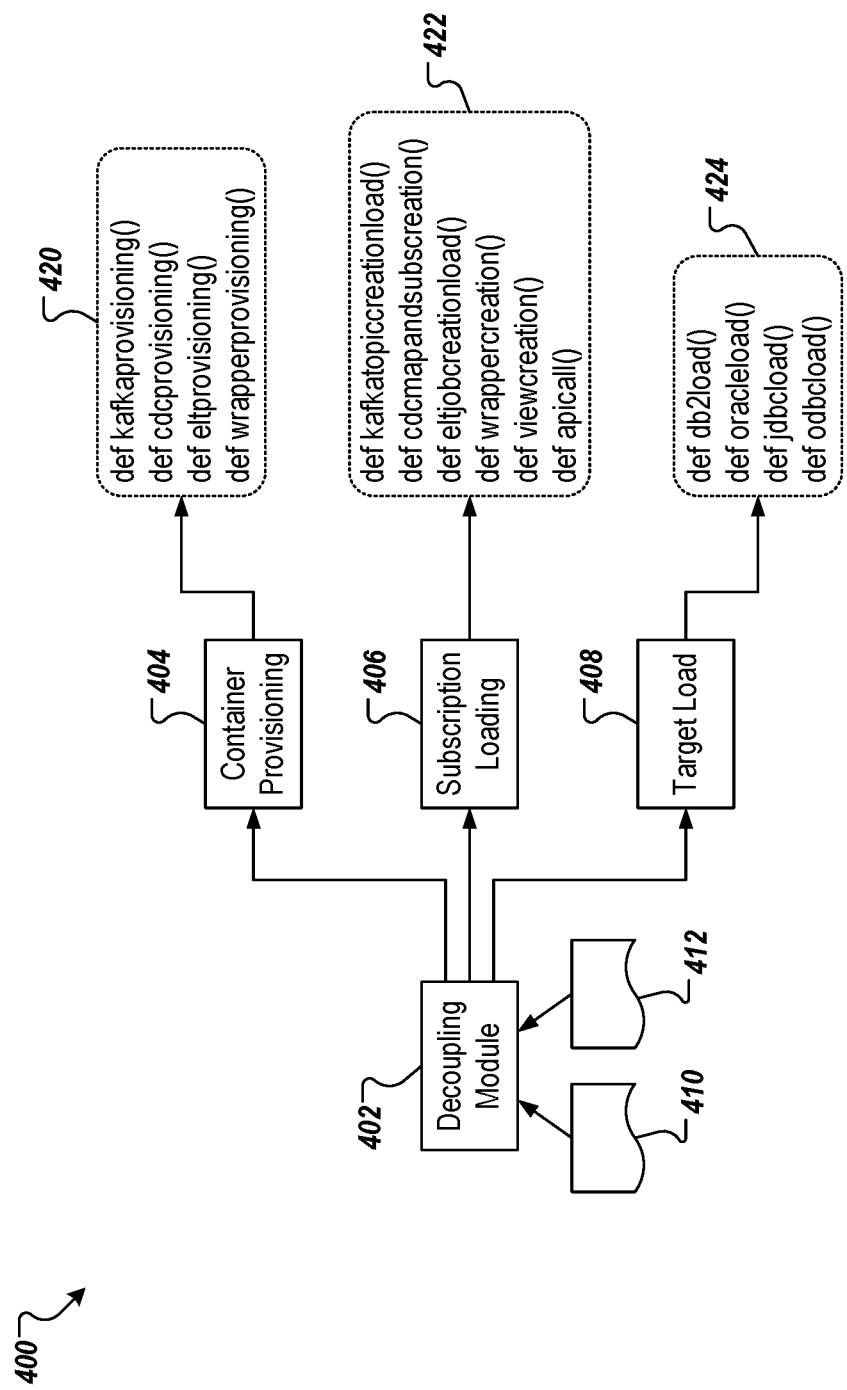
FIG. 4 depicts an example technical implementation of a (decoupling) cartridge in accordance with implementations of the present disclosure.

FIG. 4 depicts an example technical implementation 400 of a (decoupling) cartridge in accordance with implementations of the present disclosure. In the example of FIG. 4, a decoupling module 402, a container provisioning module 404, a subscription loading module 406, and a target load module 408 are provided. In some examples, the decoupling module 402 processes a decoupling approved document 410 and a questionnaire 412 to implement the recommendation. In some examples, the decoupling approved document 410 identifies the data objects that are to be offloaded to the target system 206.

The decoupling module 402 instructs each of the container provisioning module 404, the subscription loading module 406, and the target load module 408 to execute respective functionality 420, 422, 424. In some examples, the functions are coded in Python (e.g., def functions). The particular functionality that is executed depends on the design pattern(s) (i.e., recommendation(s)) that are to be implemented. For example, for the data synchronization pattern, the container provisioning module 404 executes a Kafka provisioning function to provision a Kafka container (e.g., a Docker container) image and run the Kafka container (e.g., in the cloud) and a CDC provisioning function to provision a CDC container (e.g., a Docker container) image and run the CDC container (e.g., in the cloud), the subscription loading module 406 executes a Kafka topic creation load function to automatically create and load Kafka topics for data synchronization, and a CDC mapping and subscription function to automatically create CDC mappings and topic subscriptions for data synchronization including an initial loading of the data objects to the target system 206. As another example, for the data load pattern, the container provisioning module 404 executes an ELT provisioning function to provision an ELT container (e.g., a Docker container) image and run the ELT container (e.g., in the cloud), the subscription loading module 406 executes an ELT job creation load function for automated ELT job creation and loading of data objects to the target system 206. In some examples, for each of the database synchronization pattern and the database load pattern, the target load module 408 executes a load function (e.g., Db2 load function, Oracle load function, JDBC load function, Oracle DBC (ODBC) load function) to load data to the target system 206, depending on the type of database provisioned in the target system 206.

As another example, for the database wrapper pattern, the container provisioning module 404 executes a wrapper provisioning function to provision a wrapper container (e.g., a Docker container) image and run the wrapper container (e.g., in the cloud), the subscription loading module 406 executes a wrapper creation function to automatically create a wrapper that is used to retrieve data from the legacy system 204. As another example, for the database view pattern, the subscription loading module 406 executes a view creation function to automatically execute SQL scrips to create views based on data stored in the legacy system 204. As another example, for the database service pattern, the subscription loading module 406 executes an API call function to automatically trigger calls to REST APIs to retrieve data stored in the legacy system 204.

Figure 5:
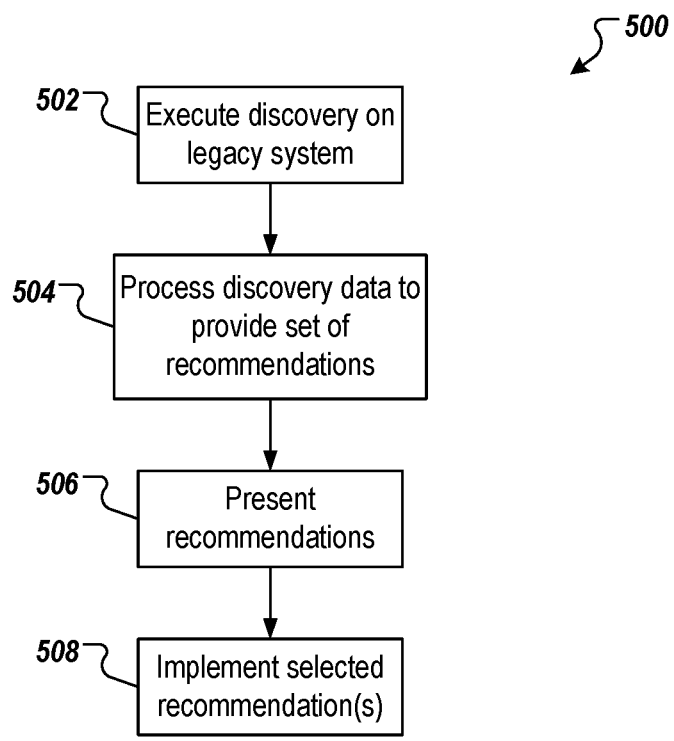
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Discovery is executed on a legacy system (502). For example, and as described herein with reference to FIG. 2, the discovery engine 230 executes multiple discovery techniques to provide discovery data from the legacy system 204. Example discovery techniques can include using a data information service of the legacy system, such as the SMF of z/OS, executing a database trace, such as Db2 trace, in the legacy system 204, using one or more monitoring tools to provide output that can be processed to extract data about frequent read-only queries with maximum CPU usage time, determining statistics from a statement cache table, utilizing index space statistics, and monitoring buffer pools. In some examples, and with reference to FIG. 3, the discovery process includes processing the exploration document 310 and the performance document 312 through the first set of functionality 330 and the second set of functionality 332 to ultimately provide discovery data. In some examples, the discovery data includes the table associations document 322 and the constraints and volume document 324.

Discovery data is processed to provide a set of recommendations (504). For example, and as described herein, at least a portion of the output of the discovery engine 230 and the questionnaire 240 are processed by the recommendation engine 232 through design pattern decision rules to identify the set of recommendations, each recommendation being associated with a respective design pattern. In some examples, each design pattern rule compares a read frequency and a write frequency of data objects associated with queries (e.g., high-cost queries, low-cost queries) to respective thresholds to determine whether a data object is associated with, for example, a high read frequency or a low read frequency, and a high write frequency or a low write frequency. In some examples, a recommendation can include a list of data objects, each associated with high CPU utilization, that are recommended to be offloaded to the target system 206 and includes a recommended design pattern for the data objects (e.g., data synchronization pattern, data loader pattern). In some examples, the recommendation is absent data objects that the questionnaire 240 indicates are preferred not to be offloaded by the enterprise. In some examples, a recommendation can include a list of data objects, each associated with low CPU utilization, that are recommended to remain on the legacy system 204 and includes a recommended design pattern for the data objects (e.g., database wrapper pattern, database view pattern, database service pattern).

The set of recommendations is presented (506). For example, and as described herein, the set of recommendations can be presented to an enterprise, on behalf of which the data digital decoupling is being performed. In some examples, the enterprise (e.g., a user (agent/employee) of the enterprise having appropriate authority) can select one or more of the recommendations in the set of recommendations for implementation. One or more selected recommendations are implemented (508). For example, and as described herein, the cartridge module 234 executes implementation of the recommendation(s) by configuring the target system 206 and offloading data from the source system 204 to the target system 206. In some examples, and with reference to FIG. 4, the decoupling module 402 instructs each of the container provisioning module 404, the subscription loading module 406, and the target load module 408 to execute respective functionality 420, 422, 424, the particular functionality depending on the design pattern(s) that are to be implemented.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for selectively offloading data objects from a legacy system to a target system, the method being executed by one or more processors and comprising:
executing, by a discovery engine of a data digital decoupling framework, a discovery process on the legacy system to provide discovery data comprising data objects stored within the legacy system and, for each data object, an access pattern and a central processing unit (CPU) utilization;
determining, from the discovery data, a set of high-cost queries and a set of low-cost queries;
for each query in the set of high-cost queries, determining an access pattern to each data object accessed by the query, the access pattern comprising a read frequency and a write frequency;
for each query in the set of low-cost queries, determining an access pattern to each data object accessed by the query, the access pattern comprising a read frequency and a write frequency;
providing, by a recommendation engine of the data digital decoupling framework, a first set of design patterns and a second set of design patterns based on access patterns of data objects, the first set of design patterns representative of first data objects of the legacy system to be offloaded to the target system, the first set of data objects determined to be associated with at least one query in the set of high-cost queries, and the second set of design patterns representative of second data objects of the legacy system to remain on the legacy system, the second set of data objects determined to be associated with at least one query in the set of low-cost queries; and
executing at least one design pattern of the first set of design patterns to offload one or more first data objects to the target system.

2. The method of claim 1, wherein the first set of design patterns comprises one or more of a data synchronization pattern and a data loader pattern.

3. The method of claim 2, wherein:
the data synchronization pattern comprises a change data capture (CDC) mechanism to update data objects in a database of the target system in response to changes to data objects in a database of the legacy system; and
the data loader pattern comprises a batch update mechanism to update data objects in a database of the target system in response to changes to data objects in a database of the legacy system.

4. The method of claim 1, wherein the second set of design patterns comprises one or more of a database wrapper pattern, a database view pattern, and a database service pattern.

5. The method of claim 4, wherein:
the database wrapper pattern comprises a wrapper of the legacy system providing read-access to data objects in a database of the legacy system through a data visualization service;
the database view pattern comprises providing one or more views in the target system to data objects in the database of the legacy system; and
the database service pattern comprises providing a service for read-only access to data objects in the database of the legacy system through an application programming interface (API).

6. The method of claim 1, wherein executing at least one design pattern of the first set of design patterns to offload one or more first data objects to the target system comprises replicating the one or more first data objects in the target system as respective one or more replicated first data objects and providing read-only access to the one or more first data objects from the target system, the one or more first data objects being maintained in the legacy system for write access.

7. The method of claim 1, wherein the legacy system comprises one or more mainframes.

8. A non-transitory computer-readable storage medium coupled to one or more processors and having instructions stored thereon which, when executed by the one or more processors, cause the one or more processors to perform operations for selectively offloading a set of data objects from a legacy system to a target system, the operations comprising:
executing, by a discovery engine of a data digital decoupling framework, a discovery process on the legacy system to provide discovery data comprising data objects stored within the legacy system and, for each data object, an access pattern and a central processing unit (CPU) utilization;
determining, from the discovery data, a set of high-cost queries and a set of low-cost queries;
for each query in the set of high-cost queries, determining an access pattern to each data object accessed by the query, the access pattern comprising a read frequency and a write frequency;

for each query in the set of low-cost queries, determining an access pattern to each data object accessed by the query, the access pattern comprising a read frequency and a write frequency;

providing, by a recommendation engine of the data digital decoupling framework, a first set of design patterns and a second set of design patterns based on access patterns of data objects, the first set of design patterns representative of first data objects of the legacy system to be offloaded to the target system, the first set of data objects determined to be associated with at least one query in the set of high-cost queries, and the second set of design patterns representative of second data objects of the legacy system to remain on the legacy system, the second set of data objects determined to be associated with at least one query in the set of low-cost queries; and executing at least one design pattern of the first set of design patterns to offload one or more first data objects to the target system.

9. The non-transitory computer-readable storage medium of claim 8, wherein the first set of design patterns comprises one or more of a data synchronization pattern and a data loader pattern.

10. The non-transitory computer-readable storage medium of claim 9, wherein:
the data synchronization pattern comprises a change data capture (CDC) mechanism to update data objects in a database of the target system in response to changes to data objects in a database of the legacy system; and
the data loader pattern comprises a batch update mechanism to update data objects in a database of the target system in response to changes to data objects in a database of the legacy system.

11. The non-transitory computer-readable storage medium of claim 8, wherein the second set of design patterns comprises one or more of a database wrapper pattern, a database view pattern, and a database service pattern.

12. The non-transitory computer-readable storage medium of claim 11, wherein:
the database wrapper pattern comprises a wrapper of the legacy system providing read-access to data objects in a database of the legacy system through a data visualization service;
the database view pattern comprises providing one or more views in the target system to data objects in the database of the legacy system; and
the database service pattern comprises providing a service for read-only access to data objects in the database of the legacy system through an application programming interface (API).

13. The non-transitory computer-readable storage medium of claim 8, wherein executing at least one design pattern of the first set of design patterns to offload one or more first data objects to the target system comprises replicating the one or more first data objects in the target system as respective one or more replicated first data objects and providing read-only access to the one or more first data objects from the target system, the one or more first data objects being maintained in the legacy system for write access.

14. The non-transitory computer-readable storage medium of claim 8, wherein the legacy system comprises one or more mainframes.

15. A system, comprising:
a computing device; and
a computer-readable storage device coupled to the computing device and having instructions stored thereon which, when executed by the computing device, cause the computing device to perform operations for selectively offloading a set of data objects from a legacy system to a target system, the operations comprising:
executing, by a discovery engine of a data digital decoupling framework, a discovery process on the legacy system to provide discovery data comprising data objects stored within the legacy system and, for each data object, an access pattern and a central processing unit (CPU) utilization;
determining, from the discovery data, a set of high-cost queries and a set of low-cost queries;
for each query in the set of high-cost queries, determining an access pattern to each data object accessed by the query, the access pattern comprising a read frequency and a write frequency;
for each query in the set of low-cost queries, determining an access pattern to each data object accessed by the query, the access pattern comprising a read frequency and a write frequency;
providing, by a recommendation engine of the data digital decoupling framework, a first set of design patterns and a second set of design patterns based on access patterns of data objects, the first set of design patterns representative of first data objects of the legacy system to be offloaded to the target system, the first set of data objects determined to be associated with at least one query in the set of high-cost queries, and the second set of design patterns representative of second data objects of the legacy system to remain on the legacy system, the second set of data objects determined to be associated with at least one query in the set of low-cost queries; and
executing at least one design pattern of the first set of design patterns to offload one or more first data objects to the target system.

16. The system of claim 15, wherein the first set of design patterns comprises one or more of a data synchronization pattern and a data loader pattern.

17. The system of claim 16, wherein:
the data synchronization pattern comprises a change data capture (CDC) mechanism to update data objects in a database of the target system in response to changes to data objects in a database of the legacy system; and
the data loader pattern comprises a batch update mechanism to update data objects in a database of the target system in response to changes to data objects in a database of the legacy system.

18. The system of claim 15, wherein the second set of design patterns comprises one or more of a database wrapper pattern, a database view pattern, and a database service pattern.

19. The system of claim 18, wherein:
the database wrapper pattern comprises a wrapper of the legacy system providing read-access to data objects in a database of the legacy system through a data visualization service;
the database view pattern comprises providing one or more views in the target system to data objects in the database of the legacy system; and
the database service pattern comprises providing a service for read-only access to data objects in the database of the legacy system through an application programming interface (API).

20. The system of claim 15, wherein executing at least one design pattern of the first set of design patterns to offload one or more first data objects to the target system comprises replicating the one or more first data objects in the target system as respective one or more replicated first data objects and providing read-only access to the one or more first data objects from the target system, the one or more first data objects being maintained in the legacy system for write access.

\* \* \* \* \*